May 7, 1940. R. S. SANFORD 2,200,013
VEHICLE CONTROL MECHANISM
Filed June 25, 1935
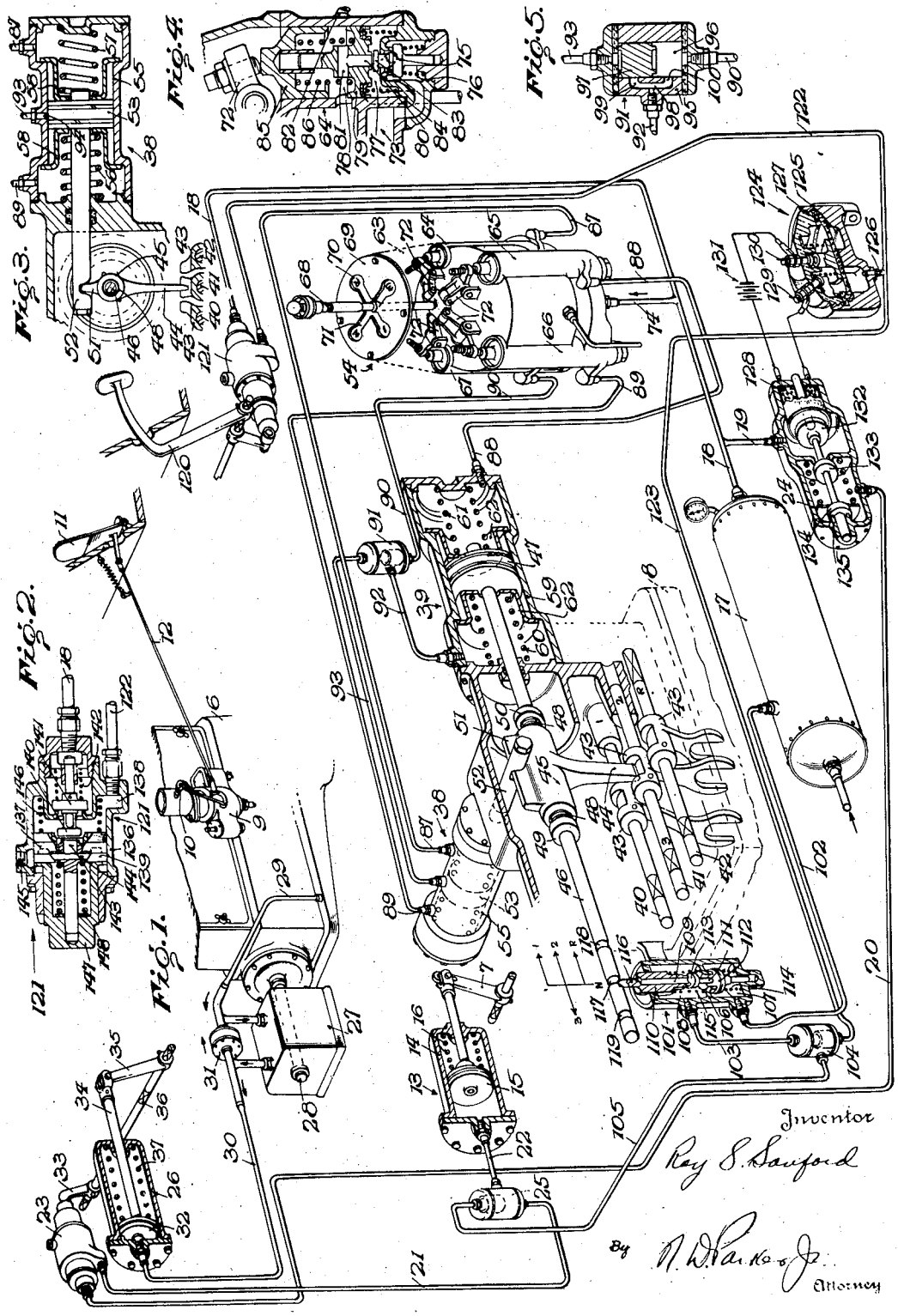

Patented May 7, 1940

2,200,013

UNITED STATES PATENT OFFICE 2,200,013

VEHICLE CONTROL MECHANISM

Roy S. Sanford, New York, N. Y., assignor to Bendix-Westinghouse Automotive Air Brake Company, Pittsburgh, Pa., a corporation of Delaware Application June 25, 1935, Serial No. 28,336

25 Claims. (Cl. 192—.01)

This invention relates to automotive vehicle controlling mechanisms and more particularly to mechanisms adapted to remotely control a selective gear-change transmission and the vehicle clutch.

One of the objects of the present invention is to provide a novel controlling mechanism for automotive vehicles so constituted that the vehicle may be operated, by means of the accelerator and brake pedals, without the necessity of utilizing a manually-operable clutch-controlling pedal.

Another object of the invention is to provide, in a device of the above character, a novel remotely-controlled combined clutch and transmission mechanism, with which changes in the transmission gear relation and control of the vehicle clutch may be readily effected without the necessity of manually operating a clutch-controlling pedal.

Still another object is to provide a novel vehicle clutch-controlling device which is operable in accordance with changes in the vehicle motor speed.

A further object is to provide a novel vehicle clutch-controlling device of the above type wherein, during idling of the vehicle motor, the clutch will be disengaged, while acceleration of the motor under the control of the usual accelerator pedal will effect clutch engagement through the action of fluid means capable of developing a pressure proportional to changes in motor speed.

A further object is to provide, in an automotive vehicle having a clutch, transmission control and accelerator, a novel combined controlling mechanism wherein the clutch may be independently controlled by the accelerator pedal or the transmission control to the end that disengagement of the clutch is automatically attained prior to initiation of changes in the transmission gear ratios.

A still further object is to provide an automotive vehicle controlling mechanism of the above referred to character which shall retain manual control of the vehicle clutch without interfering with the automatic clutch-controlling features.

A still further object is to provide a fluid pressure-operated combined transmission and clutch-controlling structure so constituted that initial movement of the transmission control will effect clutch disengagement prior to actual disengagement of the transmission gears while engagement of the clutch after a selected gear relation has been established will be under the control of the vehicle accelerator pedal.

Still a further object is to provide a plurality of correlated remote controls for a vehicle engine, clutch and transmission which will be efficient in operation, capable of ready installation without the necessity of disturbing the usual control elements of the vehicle, and especially adaptable for use in connection with vehicles wherein the motor, clutch and transmission is remotely positioned with respect to the driver's compartment.

Further objects and novel features of the invention will appear more fully hereinafter from the following detailed description of the invention when taken in connection with the accompanying drawing, wherein a preferred form of the invention is illustrated. It is to be expressly understood, however, that the drawing is employed for purposes of illustration only and is not to be taken as a definition of the limits of the invention, reference being had for this purpose to the appended claims.

In the drawing, wherein similar reference characters refer to similar parts throughout the several views:

Fig. 1 is a diagrammatic view, partly in section, of an automotive vehicle controlling mechanism constructed in accordance with the principles of the present invention;

Fig. 2 is an axial sectional view of the clutch-controlling valve employed in the system illustrated in Fig. 1;

Fig. 3 is an axial sectional view of the selector cylinder utilized as a portion of the power gear-shifting mechanism of Fig. 1;

Fig. 4 is a sectional view of one of the transmission control valves, and

Fig. 5 is a sectional view of a double check valve employed in the system shown in Fig. 1.

Referring more particularly to Fig. 1 of the accompanying drawing, a motor vehicle controlling mechanism constructed in accordance with the present invention is illustrated therein in connection with a vehicle motor 6, a clutch-controlling member 7 and a selective gear-change transmission 8. The motor is provided with a suitable carburetor 9 of well-known type having a throttle-controlling element 10 adapted to be moved to various positions by means of an accelerator pedal 11 and suitable linkage 12 therebetween in order to vary the speed of the motor. The clutch-controlling member 7 is preferably controlled by means responsive to the speed of the motor 6 and, in the form shown, is operated by a fluid pressure actuator 13 comprising cylinder and piston elements 14 and 15 respectively.

The cylinder preferably houses a spring 16 which, when fluid pressure is exhausted from the actuator 13, moves the clutch-controlling member 7 to clutch engaged position. A reservoir of fluid pressure 17 is adapted to supply pressure fluid to the clutch actuator 13 through interconnected conduits 18, 19, 20, 21 and 22, a motor-controlled valve mechanism 23, to be described hereinafter in detail, being interposed between conduits 20 and 21 for the purpose of controlling the application and exhaust of fluid pressure to and from the actuator 13. A valve mechanism 24, the purpose of which will appear hereinafter, is interposed between conduits 19 and 20 and normally establishes communication between said conduits, while a double check valve 25 serves to connect conduits 21 and 22 to establish a flow of fluid pressure to the last named conduit upon operation of the valve mechanism 23.

Preferably the clutch-controlling valve mechanism 23 is adapted to be controlled in accordance with changes in the speed of the motor 6 and, in the form shown, is associated with a controlling cylinder 26 adapted to be supplied with a hydraulic medium delivered by a suitable hydraulic pump 27 drivably connected with a shaft 28 of the vehicle motor. As illustrated, the pump 27 is adapted to communicate with the lubricant supply of the motor 6 through a conduit 29 and conducts fluid under pressure to the cylinder 26 through conduit 30. It will be understood, however, that the invention is not limited to the use of any specific type of pump nor to any specific fluid pressure medium but that any source of fluid pressure, the pressure of which is proportional to the speed of the vehicle motor, may be utilized. As will be readily understood by those skilled in the art, the pump 27 withdraws lubricant from the motor 6 through conduit 29 and delivers the same to the cylinder 26 through conduit 30, there being provided a suitable by-pass valve 31 for connecting the outlet and inlet of the pump when the pressure of the fluid delivered to the cylinder 26 reaches a predetermined value. The cylinder 26 houses a piston 32 suitably connected with a valve-actuating arm 33 through the rod 34, lever 35 and rock shaft 36. The above described parts are normally urged, during idling of the motor 6 and consequent low pressure developed by the pump 27, to the position shown, as by means of a graduating spring 37, wherein the controlling valve mechanism 23 serves to admit fluid pressure to the conduit 21 and thence through conduit 22 to the clutch actuator 13 to effect clutch disengaging movement of the clutch member 7. It will be readily understood, however, that if engagement of the vehicle clutch is desired, the operator merely depresses the accelerator 11 to effect an increase in the speed of the motor 6 and hence the pump 27, the increase in the fluid pressure of the latter delivered to the cylinder 26, serving to move the piston 32 and valve-actuating parts connected thereto in opposition to the graduating spring 37 to move valve mechanism 23 to exhaust position in order to permit clutch engaging movement of the clutch member 7 under the action of the usual clutch return springs supplemented by the action of spring 16 associated with the clutch actuator 13.

In order to provide a remotely-controlled, power-operated, gear-changing transmission, the present invention provides a selecting fluid pressure actuator 38 and a shifting fluid pressure actuator 39 which are associated with the usual shifter bars 40, 41 and 42 of the vehicle transmission 8. As shown, each of these bars is provided with the usual slotted members 43 which are adapted to be selectively engaged by the lower end portion 44 of a combined selector and shifter finger or member 45, the latter being slidably mounted on a piston rod 46 of a piston 47 and normally resiliently centered as by means of springs 48 between two collars 49 and 50 secured to said piston rod. The foregoing construction is such, however, that some lost motion exists between the piston rod 46 and the finger 45, permitting movement of the former prior to movement of the latter. The finger 45 is, moreover, provided with an elongated flanged extension 51 having a suitable connection with a piston rod 52 carried by a piston 53, the last named piston being associated with the actuator 38 while the piston 47 is associated with the actuator 39.

The actuator 38 is adapted to control the selecting movements of the member 45 through the connections above described, and in order to secure such control, the same is adapted to be supplied with fluid pressure from a remotely-positioned, manually-operated controlling device 54. The actuator 38, moreover, includes a cylinder 55 housing the piston 53, and in order that the latter may be normally centered with respect to the cylinder when fluid pressure is exhausted from both ends thereof, suitable precompressed resilient devices, such as springs 56 and 57, Fig. 3, are employed, each of said springs being limited in its expanding movement by means of cups 58. In assembling the parts of the actuator 38, the springs 56 and 57 are placed under initial compression, and from such a construction, it will be readily observed that the piston 53 is resiliently maintained in central position with respect to the cylinder 55, when fluid pressure is exhausted from both ends of the latter.

The shifting actuator 39 comprises a cylinder 59 housing the piston 47 and on either side of the latter are located precompressed springs 60 and 61, the expansive movement of which is also limited as by means of cups 62, the construction being similar to that employed in connection with the actuator 38 and also such as to move the piston 47 to central position with respect to the cylinder 59 when both ends of the latter are exhausted.

The remotely-positioned, manually-operable transmission control device 54 is constituted by a suitable casing 63 housing a plurality of similar valve mechanisms 64, 65, 66 and 67, and these valve mechanisms are adapted to be selectively operated as by means of a manually-operable control lever 68, the movements of which are suitably guided as by means of a slotted cover 69 for the casing 63. As shown, the cover 69 is provided with right-angularly intersecting slotted portions 70 and 71, but it will be readily understood that other suitable guiding slots may be provided in the cover for controlling the selection and establishment of a desired gear relation, depending upon the particular vehicle transmission utilized. In the present instance, and for purposes of illustration only, movement of the control lever 68 to the left and right in slot 70 establishes first and reverse gear relations respectively, while movement of the control lever to the left and right in slot 71 establishes second and third gear relations respectively. Such movements of the control lever 68 operate the proper control valves 64, 65, 66 and 67 through suitable cam-controlled rocker arms 72. It will be understood that the lever 68 is pivotally mounted in any suitable manner in order to effect the above described valve operations. Preferably the device 54 is constructed as shown in the application of Roger H. Casler, et al., Serial No. 697,193, filed November 8, 1933, and includes a pivotal mounting for the control lever below the valve actuating rocker arms.

Referring more particularly to Fig. 4, there is illustrated therein a sectional view of the valve mechanism 64, it being understood that the valves 65, 66 and 67 are similar in construction. As shown in this figure, the casing 63 is provided with a chamber 73 adapted to communicate directly with the reservoir 17 through conduits 18 and 74, and in the position shown, the valve 64 interrupts the flow of liquid pressure therethrough by means of an intake valve 75 resiliently moved to closed position as by means of spring 76. The valve mechanism is provided with an outlet chamber 77 and an exhaust chamber 78, there being interposed between these chambers a piston 79 provided with an intercommunicating ducts 80 and 81 normally connecting the outlet chamber 77 with an atmospheric connection 82 through a normally open exhaust valve 83 connected to and movable with the intake valve 75. The piston 79 is normally maintained in the position shown as by means of a spring 84 in order to exhaust the outlet chamber 77. An actuating cap 85 adapted to be moved downwardly by the rocker arm 72 is slidably received within the valve casing and moves the piston 79 through a graduating spring 86 to close off the exhaust valve 83 and open the intake valve 75 to thereby admit fluid pressure to the valve chamber 77 when it is desired to effect a gear-changing operation.

As shown in Fig. 1, the valves 64, 65, 66 and 67 are provided with outlet conduits 87, 88, 89 and 90 which communicate with the respective valve outlet chambers 77 and serve to conduct fluid pressure to the proper transmission actuators 38 and 39. Conduits 87 and 89 lead respectively to the right and left-hand portions of the actuator 38, while conduits 88 and 90 lead respectively to the right-hand portion of the actuator 39 and to one end of a double check valve 91, a conduit 92 connecting said check valve to the left-hand end of actuator 39. The check valve 91 also communicates through a conduit 93 with a centrally-positioned port 94 located in the side wall of the cylinder 55 of the actuator 38, such connection being provided for the purpose of admitting fluid pressure to the shifting actuator through the positioning actuator after sufficient movement of the piston 53 of the latter has taken place whereby the said port is uncovered.

The above referred to double check valve 91 is similar in construction to the double check valve 25 and is more clearly disclosed in Fig. 5. Referring to the latter figure, the check valve comprises a casing 95 provided with a chamber 96 communicating with conduits 90 and 93 respectively, the chamber 96 also communicating with the conduit 92. Housed within the chamber 96 is a slidable valve element 97 which cooperates with a duct 98 having spaced openings 99 and 100 into said chamber, the construction being such that flow of fluid pressure through conduit 90 will move the valve element 97 upwardly as shown in Fig. 5 to connect conduits 90 and 92, while application of fluid pressure through conduit 93 will move the valve element 97 downwardly to connect conduits 93 and 92.

From the foregoing, it will be readily understood that with the parts in the position shown, the actuators 38 and 39 serve to position the selecting member 45 in neutral position through action of the preloaded centralizing springs, the lower portion 44 of the member 45 engaging the central shifter bar 41. In the event that first gear relation is desired, the control member 68 is moved to the left-hand extremity of slot 70 to admit fluid pressure through valve 66 from the reservoir 17 to the left-hand portion of actuator 38 by means of conduit 89. Movement of the piston 53 in said actuator will rock the member 45 to such a position that the lower end thereof will select shifter bar 40, fluid pressure being admitted to the left-hand portion of actuator 39 as soon as piston 53 has uncovered port 94 in the wall of the cylinder 55 which is so timed as to take place after selection of the shifter bar 40. Fluid pressure in the left-hand end of actuator 39 will move the piston 47 thereof to the right to effect similar movement of the shifter bar 40 in order to establish first gear relation. The other gear relations are established in a similar manner as will appear more fully hereinafter.

The vehicle clutch control heretofore described functions in accordance with changes in the vehicle motor speed and hence is under the direct action of the motor accelerator pedal. The construction is such that the clutch will be disengaged at low motor speeds, such as idling speed for example, and hence in the event that the vehicle is traveling in intermediate gear relation and it is desired to change to high gear relation, the vehicle clutch could not be disengaged by the means heretofore described by reason of the increased motor speed. In order, therefore, to insure disengagement of the clutch during changes in the transmission gear relations, independent means associated with the shifter piston rod 46 are provided for effecting disengagement of the clutch when it is desired to shift from one gear relation to another. As shown, such means are constituted by a valve device 101 which serves to admit fluid pressure from the reservoir 17 through conduits 102 and 103, double check valve 104, conduit 105 and double check valve 25 to the clutch actuator 13. More particularly, the valve 101 comprises a casing 106 providing an intake chamber 107 and an outlet chamber 108, the latter in the position shown communicating with the atmosphere by means of a duct 109 provided in the valve-actuating member 110. A combined intake and exhaust valve assembly 111 is contained in the casing and includes an intake valve 112 and an exhaust valve 113, the assembly being normally moved to the position shown as by means of a spring 114 to close the intake valve 112. A spring 115 also normally serves to move the valve-actuating member 110 upwardly to maintain the outlet chamber 108 in communication with the atmosphere. The latter member is provided with an actuating stem 116 adapted to cooperate with grooves 117, 118 and 119 provided in the piston rod 46, the stem 116 when occupying said grooves serving to interrupt the flow of fluid pressure through the valve 101 to the clutch actuator 13. However, upon movement of the rod 46 in either direction a sufficient amount to move said grooves out of registry with the actuating stem 116, the stem will be cammed downwardly to close the exhaust valve 113 and open intake valve 112 to supply fluid pressure from the reservoir to the clutch actuator to effect clutch disengaging movement of the latter. Such operation occurs upon movement of the rod 46 in either direction from neutral position as represented by groove 117 to effect disengagement of the clutch prior to engagement of the selected transmission gears. Such disengagement of the clutch likewise occurs upon movement of the piston rod 46 from either of its extreme positions where a gear relation has been previously established, and it will be noted that by reason of the lost motion connection between selecting member 45 and collars 49 and 50 secured to piston rod 46, actuation of the valve 101 will take place prior to movement of the selector member 45 to interrupt a previously established gear relation. Thus disengagement of the clutch will be automatically effected by the shifting actuator 39 prior to disengagement of the transmission gears. It will be understood, of course, that after disengagement of the gears and neutralizing of the latter, the vehicle motor speed drops to idling, whereupon continued disengagement and subsequent engagement of the clutch, after establishment of another gear relation, is controlled by movement of accelerator pedal 11 as heretofore described.

In order that manual control of the clutch-controlling member 7 may be retained without sacrificing any of the automatic features heretofore described in detail, a suitable manually-operable pedal 120, remotely positioned with regard to the clutch-controlling member 7, is adapted to control the application and exhaust of fluid pressure to and from the clutch actuator 13 through a clutch-controlling valve 121 similar in construction to the valve 23. As shown, the valve 121 is adapted to communicate with conduits 122 and 18 and when operated directs fluid pressure from reservoir 17 through conduits 122 and 123 to the double check valve 104 which is similar in construction to the check valves 25 and 91. The valve element of the check valve 104 will be moved to such a position in response to the fluid pressure in conduit 123 to connect the last named conduit with conduit 105 and hence fluid pressure will flow through double check valve 25 to the clutch actuator 13. Thus clutch disengaging movement of the latter may be readily effected by manually depressing the pedal 120.

When manual control of the clutch is exercised, it is desirable to render the automatic control of the clutch through the agency of the motor driven pump 27 inoperative, and to this end the flow of fluid pressure through conduit 20 is arrested. As shown, a pressure-operated valve 124, communicating with conduit 122, is provided with a chamber 125 which receives fluid pressure from said conduit through a connection 126. The pressure within said chamber forces a diaphragm 127 in valve 124 upwardly to complete a connection to a solenoid 128 of valve 24 through terminals 129 and 130, a suitable battery 131 being included in the circuit in order to supply the requisite electrical energy. Upon energization of solenoid 128, an armature 132 connected to interconnected intake and exhaust valves 133 and 134 serves to move the intake valve 133 to closed position and open the exhaust valve 134 to connect the conduit 20 to atmosphere through a port 135 of valve 124. Thus when manually-controlled clutch operation is desired, application of fluid pressure to the conduit 122 cuts off the supply of fluid pressure from the conduit 20 and connects the latter to atmosphere through valve 24.

The clutch-controlling valve 121, similar to the valve 23, is shown in detail in Fig. 2 and includes a casing 136 housing a piston 137, the latter dividing the casing into inlet and exhaust chambers 138 and 139 respectively. Within the casing, there are also positioned interconnected exhaust and intake valves 140 and 141 respectively, the intake valve being normally closed as by means of a spring 142, thereby interrupting communication between conduits 18 and 122, while the exhaust valve 140 is normally open and serves to connect chamber 138 with the exhaust chamber 139 through intercommunicating ducts 143 and 144. The exhaust chamber is constantly connected to the atmosphere through a port 145. The piston 137 is normally maintained in the position shown as by means of a spring 146 and is adapted to be moved to the right, as viewed in Fig. 2, by application of manual pressure to an actuating stem 147, movement of the latter being transmitted to the piston through a graduating spring 148. It will be readily understood from the above that since the piston 137 of the valve 121 is actuated through the graduating spring 148, the valve is of the self-lapping type. That is, upon a predetermined degree of compression of the graduating spring, through manual operation of the cap 147, the piston 137 will be moved a certain predetermined distance to effect a corresponding degree of opening of the intake valve 141. As soon as the pressure admitted to chamber 138 reaches a predetermined value, however, such pressure will react against the piston 137 to move the latter and permit the valve assembly constituted by exhaust and intake valves 140 and 141 respectively to be moved to lapped position against the action of spring 148. Hence the application and release of fluid pressure to and from the clutch actuator 13 may be readily regulated by the manual pressure applied to the valve 121, and since the valve 23 is constructed in the same manner, it will be perceived that clutch-engaging movement of the clutch-actuating member 7 may be readily remotely controlled by positioning the accelerator pedal 11 for various motor speeds.

In operation, with the parts occupying the normal position shown in Fig. 1, with the motor 6 idling and the transmission 8 in neutral position, the control cylinder 26 through the action of spring 37 effects operation of valve 23 to admit fluid pressure to the actuator 13 effecting clutch disengaging movement of the member 7. Any increase in the speed of the motor 6 through increase in the degree of throttle opening sufficient to effect an increase in the pressure of the fluid delivered by the pump 27 to the cylinder 26 to exhaust valve 23, will permit reengaging movement of the clutch member 7 through the action of the usual clutch return springs supplemented by the action of spring 16. This engaging operation may be readily controlled through the accelerator pedal 11, since, as heretofore described, the valve 23 through its self-lapping characteristic may be actuated to regulate the degree of fluid pressure in the clutch actuator 13.

In the event that first gear relation is desired by the operator, it is merely necessary to move the transmission control member 68 to the left-hand extremity of slot 70 whereupon valve 66 will be operated to admit fluid pressure from the reservoir 17 through the said valve to the left-hand portion of the selector actuator 38 by means of conduit 89. The piston 53 of said actuator will thereupon effect oscillation of the selecting finger 45 in order to bring the lower portion 44 thereof into registry with the slotted member 43 of the shifter bar 40. When such operation has been effected, port 94 positioned in the side wall of the cylinder 55 will be uncovered in order to conduct fluid pressure from the selecting actuator through conduit 93, double check valve 91 and conduit 92 to the left-hand portion of the shifting actuator 39. The piston 47 in the latter will thereupon be moved to the right, as viewed in Fig. 1, in order to effect corresponding movement of the shifter bar 40 and consequent establishment of the first gear relation. Thereafter, it is only necessary to depress the accelerator pedal 11 in order to increase the pressure of the fluid delivered by the pump 27, through the increase in speed of the said pump, the valve 23 being moved to exhaust position by the fluid pressure applied to the controlling cylinder 26 to permit clutch engaging movement of the actuator 13, as heretofore described. With first gear relation established, the valve 101 operated by the piston rod 46 will have its actuating stem 116 registering with the groove 119 on said piston rod. The valve 101 will in this position cut off the flow of fluid from the reservoir 17 to the double check valve 104.

If it now be desired to establish second gear relation, it is merely necessary to return the transmission control lever 68 to neutral position shown and then move the same to the left-hand extremity of slot 71. During the movement of the control lever to the neutral position, the valve 66 is moved to exhaust position through the action of the spring 84 associated with the piston 79, see Fig. 4. Thus the left-hand portion of actuator 39 will be exhausted through the actuator 38, conduit 89, chamber 77 of the valve and intercommunicating ducts 80 and 81, the construction being such that the piston 47 will be moved to central position by means of the springs 61 associated therewith prior to the cutting off of port 94 by the spring centralized return movement of the piston 53 of the actuator 38. Thus the shifter bar 40 will be returned to neutral position and the shifting finger 45 will be restored to the position shown. It is to be noted, however, that as soon as piston 47 starts to return to its normal central position with respect to the cylinders 59, the actuating stem 116 of valve 101 is moved downwardly by reason of the camming action of the piston rod 46 as the groove 119 thereon is moved out of registry with the stem 116. This will effect downward movement of the member 110 to close off the exhaust valve 113 and open the intake valve 112 to establish a flow of fluid pressure from the reservoir 17 to double check valve 104 through conduits 102 and 103, and thence to the clutch actuator 13 by way of conduit 105, double check valve 25 and conduit 22. In admitting fluid pressure to double check valve 25, the valve element therein will be moved downwardly in order to establish communication between the conduits 105 and 22. During the above described initial movement of the piston 47 and operation of the valve 101, the lost motion existing between the selector finger 45 and collars 49 and 50 enables sufficient movement of the piston 47 to operate the valve 101 prior to actual movement of the shifting finger 45. Thus fluid pressure will be applied to the clutch actuator 13 to effect clutch disengaging movement of the member 7 prior to movement of the selector and shifting finger 45, in order to insure vehicle clutch disengagement prior to an attempt to interrupt the first gear relation. Continued movement of the piston 47 of the actuator 39 will, however, move the finger 45 to effect a neutralized position of the shifter rod 40 and the actuator 38 will return the shifter finger to the position shown, as heretofore described.

It will be readily appreciated that as soon as the piston 47 has been actually returned to the central position shown in Fig. 1, valve 101 will be exhausted by reason of the registry of the actuating stem 116 with the neutralizing groove 117 on the piston rod 46. However, the vehicle clutch will remain in disengaged position by reason of the fact that the motor speed 6 has been reduced to idling speed and fluid pressure is conducted to the clutch actuator 13 through the valve 23 which is placed in operative position by the spring 37 in the controlling cylinder 26.

In completing the second gear relation, by moving the control lever 68 to the left-hand extremity of the slot 71, the valve 67 is operated to admit fluid pressure directly to the left-hand portion of actuator 39 through conduits 90 and 92 interconnected by the double check valve 91. It will be understood that when such action occurs, the valve element of the double check valve 91 will be moved upwardly to connect the conduits 90 and 92 and piston 47 will be moved to the right in order to effect corresponding movement of the center shifter bar 41, such movement of the latter completing second gear relation. Reengagement of the vehicle clutch is thereafter secured by depression of the accelerator pedal 11, as heretofore described.

Movement of the gear shifting control member 68 to the right-hand extremity of the slot 71 will first effect a disengagement of the vehicle clutch through the automatic action of valve 101, as heretofore described, and subsequently return the shifter bar 41 to neutral position. Thereafter, the clutch actuator 13 is supplied with fluid pressure through valve 23, by reason of the idling condition of the motor 6 and, subsequently, when the valve 65 is operated, fluid pressure will be supplied to the reservoir 17 through the said valve directly to the right-hand portion of the actuator 39 through conduit 88. The shifter bar 41 will then be moved to the left in order to establish third gear relation.

The reverse gear relation is secured by positioning the control lever 68 on the right-hand extremity of the slot 70, such action furnishing fluid pressure to the right-hand portion of actuator 38 and through the port 94 thereof to the left-hand portion of actuator 39. This operation takes place in a manner following the operations heretofore described and effects selection of the shifter bar 42 and movement thereof to the right, as viewed in Fig. 1.

If at any time the vehicle operator desires to dispense with the automatic clutch operation heretofore described, the clutch-controlling pedal 120 is provided which, when operated, will serve to effect manual control of the clutch member 7 to the exclusion of the automatic controls. As has been previously pointed out, operation of the pedal 120 through the valve 121 exhausts the pressure line 20 through actuation of the valves 124 and 24 and serves to control the admission of fluid pressure to the clutch actuator 13 through conduits 18, 122, 123, 105 and 22.

There has thus been provided by the present invention a novel clutch and transmission control device wherein the vehicle transmission and the clutch may be remotely controlled in a simple and efficient manner. The provision of the fluid-operated pump for controlling the disengagement and engagement of the vehicle clutch under the control of the accelerator pedal together with the self-lapping valve controlled by the fluid pressure delivered by said pump permits engaging operation of the clutch member to be effected at the will of the operator, that is depending upon the degree of depression of the accelerator pedal and consequent pressure developed by the pump. In other words, if clutch engagement takes place too rapidly, it is merely necessary to decrease the speed of the pump by permitting a slight return movement of the accelerator pedal. The provision of the fluid pressure actuators for effecting selection and establishment of desired gear relations enables a remote control to be utilized and the construction is such that disengagement of the clutch is automatically effected by movement of the transmission control device prior to disengagement of an established gear relation, thus insuring disengagement of the clutch irrespective of the speed of the vehicle motor. While provision has been made for automatic control of the clutch in order to relieve the operator of as many of the usual operations as are required in the operation of a motor vehicle, still the invention retains the feature of manual clutch control which can be practiced at any time and without the necessity of doing anything more than depressing the manually-operable pedal. Additionally, return of this pedal to neutral position immediately renders the automatic clutch controls operable to function in their proper manner.

While only one embodiment of the invention has been shown herein, it is to be understood by those skilled in the art that the same is not limited to the form shown but may be embodied in various other forms. Furthermore, certain parts of the control may be utilized without others, as for example the automatic clutch control may be employed to the exclusion of the transmission control, and various other changes may be made in the arrangement of the parts without departing from the spirit of the invention. Reference will, therefore, be had to the appended claims for a definition of the limits of the invention.

What is claimed is:

1. In a motor vehicle having a motor, a clutch-controlling member, and a transmission of the type having an element oscillatable to select and longitudinally movable to establish a desired gear relation, fluid-operated means for controlling disengaging and engaging movements of said clutch member, motor-operated means for controlling the flow of fluid pressure to said fluid-operated means, fluid motor means for oscillating said element, a second fluid motor means for moving said element longitudinally, and means operable by said second motor means for effecting clutch disengaging movement of said clutch member prior to engagement of said element.

2. In a motor vehicle having a motor, a clutch-controlling member, and a transmission of the type having an element oscillatable to select and longitudinally movable to establish a desired gear relation, fluid-operated means for controlling disengaging and engaging movements of said clutch member, means for controlling the flow of fluid pressure to said fluid-operated means, means dependent upon the speed of the motor for operating said controlling means, fluid motor means for oscillating said element, a second fluid motor means for moving said element longitudinally, and means operable by said second motor means for effecting clutch disengaging movement of said clutch member prior to movement of said element.

3. In a motor vehicle having a motor, a clutch-controlling member, and a transmission of the type having an element oscillatable to select and longitudinally movable to establish a desired gear relation, fluid-operated means for controlling disengaging and engaging movements of said clutch member, means for controlling the flow of fluid pressure to said fluid-operated means, means dependent upon the speed of the motor for operating said controlling means, fluid motor means for oscillating said element, a second fluid motor means for moving said element longitudinally, and valvular mechanism operable by said second motor means prior to movement of said element for effecting clutch disengaging movement of said clutch member independently of said speed dependent means.

4. In a motor vehicle having a motor, a clutch-controlling member, and a transmission of the type having an element oscillatable to select and longitudinally movable to establish a desired gear relation, fluid-operated means for controlling disengaging and engaging movements of said clutch member, means for controlling the flow of fluid pressure to said fluid-operated means, means dependent upon the speed of the motor for operating said controlling means, fluid motor means for oscillating said element, a second fluid motor means for moving said element longitudinally, a remotely-positioned, selectively-operable control lever for controlling the flow of fluid pressure to said motor means to effect selection and establishment of a desired gear relation, and means operable by said second motor means upon movement in either direction to effect clutch disengaging movement of said clutch member independently of said speed dependent means.

5. In a motor vehicle having a motor, a clutch-controlling member, and a transmission control, a fluid pressure pump driven by said motor, a power actuator for controlling disengaging and engaging movements of said clutch member, valvular means for supplying fluid pressure to said actuator, means dependent upon the pressure of the fluid delivered by said pump for determining operation of said valvular means, and means operated by said transmission control for supplying fluid pressure to said actuator independently of said valvular means.

6. In a motor vehicle having a motor, and a clutch-controlling member, a fluid pressure pump driven by said motor, a power actuator having a movable element connected with said clutch member, resilient means associated with said actuator for biasing said member to clutch engaged position, means for admitting fluid pressure to said actuator to move said element and member to clutch disengaged position, a control device for said last named means communicating with said pump, and a spring associated with said control device and normally biasing the latter and said last named means to pressure-admitting position when the motor is idling, said device being responsive to increased fluid pressure developed by said pump when the motor speed is increased to move said last named means to exhaust fluid pressure from said actuator.

7. In a control for motor vehicle having a motor, clutch-controlling member and transmission, means for resiliently biasing said member to clutch engaged position, a fluid pump driven by said motor, means dependent upon the pressure developed by said pump for controlling the clutch disengaging movement of said clutch member, fluid pressure control means for said transmission, and means operable by movements of said latter means for effecting clutch disengaging movement of said member independently of said pump.

8. In a control for motor vehicle having a motor, clutch-controlling member and transmission, means for resiliently biasing said member to clutch engaged position, a fluid pump driven by said motor, means dependent upon the pressure developed by said pump for controlling the clutch disengaging movement of said clutch member, fluid pressure control means for said transmission, means operable by movements of said latter means for effecting clutch disengaging movement of said member independently of said pump, and manually-controlled means for effecting clutch disengaging movement of said clutch member independently of said pump and transmission control means.

9. In a motor vehicle having a motor, and a clutch-controlling member, a fluid pressure pump driven by said motor, a power actuator for controlling disengaging and engaging movements of said clutch member, valvular means for supplying fluid pressure to said actuator, means dependent upon the pressure of the fluid delivered by said pump for determining operation of said valvular means, and manually-operable means for interrupting the supply of fluid pressure to said valvular means and for supplying fluid pressure to said actuator independently of said valvular means.

10. In a motor vehicle having a motor and a clutch-controlling member, a throttle for controlling the speed of said motor, a hydraulic pump driven by said motor, a power actuator operable to move said clutch member to clutch disengaging position upon the admission of fluid pressure thereto, resilient means for causing clutch engaging movement of said clutch member when fluid pressure is exhausted from said actuator, valvular means for controlling the admission and exhaust of fluid pressure to and from said actuator, hydraulically-operated pressure control means for said valvular means communicating with said pump and operative at closed throttle position and consequent low hydraulic pressure to move said valvular means to admit fluid pressure to said actuator, said pump developing sufficient pressure when the throttle is opened to operate said control means to exhaust the valvular means thereby enabling clutch engaging movement of said clutch member under the action of said resilient means.

11. In a motor vehicle having a motor and a clutch-controlling member, a power actuator for controlling the disengaging and engaging movements of said member, valvular means for admitting and exhausting fluid pressure to and from said actuator, a hydraulic pump driven by said motor and developing a hydraulic pressure proportional to the motor speed, and means governed by the hydraulic pressure developed by said pump in response to changes in motor speed for operating said valvular means.

12. In a motor vehicle having a motor and a clutch-controlling member, a power actuator for controlling the disengaging and engaging movements of said member, a reservoir of fluid pressure, valvular means connected with said reservoir for admitting and exhausting fluid pressure to and from said actuator, a fluid pressure pump driven by said motor and developing a pressure proportional to the motor speed, and means governed by the pressure developed by said pump in response to changes in motor speed for operating said valvular means.

13. In a motor vehicle having a motor and a clutch-controlling member, a power actuator for controlling the disengaging and engaging movements of said member, a reservoir of fluid pressure, valvular means connected with said reservoir for admitting and exhausting fluid pressure to and from said actuator, a fluid pressure pump driven by said motor and developing a pressure proportional to the motor speed, means governed by the pressure developed by said pump in response to changes in motor speed for operating said valvular means, and manually-operable means for connecting said actuator and reservoir at the will of the operator independently of said valvular means.

14. In a motor vehicle having a motor provided with a throttle and a throttle-controlling member, a clutch-controlling element, a transmission provided with shifting means, a fluid actuator operatively connected with said element, means controlled by motor speed in response to movements of said member for controlling the application of fluid pressure to said actuator, and means operable by said shifting means for controlling the application of fluid pressure to said actuator.

15. In combination with a vehicle clutch-controlling member and a shiftable gear-changing element, a fluid motor for actuating said member, a fluid actuator for shifting said element, means for supplying actuating fluid to said actuator to shift said element to establish a desired gear relation, and means operated by said actuator driving initial movement thereof for controlling the flow of actuating fluid to said motor.

16. In combination with a vehicle clutch-controlling member and a shiftable gear-changing element, a fluid motor for actuating said member, a fluid actuator for shifting said element, means including a lost motion connection for connecting said actuator and element, means for supplying actuating fluid to said actuator to move the latter prior to shifting of said element, and means operated by said actuator during its initial movement for controlling the flow of actuating fluid to said motor.

17. In combination with a vehicle clutch-controlling member and a shiftable gear-changing element, a fluid motor for actuating said member, a fluid actuator including a double-acting piston for shifting said element in either of opposite directions, means for normally maintaining said piston in neutral position, means for supplying actuating fluid to said actuator to move said piston in either of opposite directions from said neutral position, and means controlled by movement of said piston during its initial movement in either direction for admitting actuating fluid to said motor.

18. In a vehicle-controlling mechanism having a clutch-controlling member and a gear-shifting element, power means for operating said member, power means for operating said element, means including a lost motion connection for connecting said last named power means and said element, means for energizing said last named power means, and means controlled by operation of said last named power means during movement thereof to take up said lost motion connection for energizing said first named power means.

19. In a motor vehicle having a motor, a clutch-controlling member, and a transmission of the type having an element movable to select and shiftable to establish a desired gear relation, fluid-operated means for controlling disengaging and engaging movements of said clutch member, valve means for controlling the flow of fluid to said fluid-operated means, means responsive to the speed of the motor for operating said valve means, separate fluid-operated motors for moving and shifting said element, and other valve means operable by the fluid-operated motor for shifting said element for controlling the flow of fluid to said fluid-operated means.

20. In a motor vehicle having a motor, a clutch-controlling member, and a transmission of the type having an element oscillatable to select and longitudinally movable to establish a desired gear relation, fluid-operated means for controlling disengaging and engaging movements of said clutch member, means for controlling the flow of fluid to said fluid-operated means, means dependent upon the speed of the motor for operating said controlling means, fluid motor means for oscillating said element, a second fluid motor means for moving said element longitudinally, and valve means operable by said second motor means for conducting fluid to said fluid-operated means prior to movement of said element.

21. In combination with a vehicle clutch-controlling member and a shiftable gear-changing element, a fluid motor for actuating said member, a fluid actuator including a piston and piston rod for shifting said element in either of opposite directions from a neutral position to establish a desired gear relation, means to supply fluid to said actuator to move said piston and piston rod in either of said opposite directions, and valve means actuated by said piston rod during initial movement of the piston in either direction for admitting fluid to said motor.

22. In combination with a fluid clutch-controlling member and a shiftable gear-changing element, a fluid motor for actuating said member, a fluid actuator including a piston and piston rod for shifting said element in either of opposite directions from a neutral position to establish a desired gear relation, means to supply fluid to said actuator to move said piston and piston rod in either of said opposite directions, valve means for admitting fluid to said motor, and cam means associated with said piston rod for operating said valve means during initial movement of the piston in either direction.

23. The combination of a vehicle clutch-controlling member and a shiftable gear-changing element, a fluid motor for actuating said member, a fluid actuator including a piston and piston rod for shifting said element in either of opposite directions from a neutral position to establish a desired gear relation, means including a lost motion connection for connecting said piston rod and element, means to supply fluid to said actuator to move said piston and piston rod in either of said opposite directions, and valve means actuated by said piston rod during movement of the piston in either direction to take up said lost motion connection for admitting fluid to said motor.

24. In combination with a vehicle clutch-controlling member and a shiftable gear-changing element, a fluid motor for actuating said member, a fluid actuator including a piston and piston rod for shifting said element in either of opposite directions from a neutral position to establish a desired gear relation, means including a lost motion connection for connecting said piston rod and element, means to supply fluid to said actuator to move said piston and piston rod in either of said opposite directions, valve means for admitting fluid to said motor, and cam means associated with said piston rod for operating said valve means during movement of the piston in either direction to take up said lost motion connection.

25. In a motor vehicle having a motor, a clutch-controlling member, and a transmission control, a power actuator for controlling disengaging and engaging movements of said clutch member, valvular means for supplying fluid pressure to said actuator, means responsive to motor speed for determining operation of said valvular means, and means operated by said transmission control for supplying fluid pressure to said actuator independently of said valvular means.

ROY S. SANFORD.